May 4, 1926.
J. H. PIKE ET AL
1,583,366
AUTOMOBILE HEADLIGHT
Filed July 8, 1925
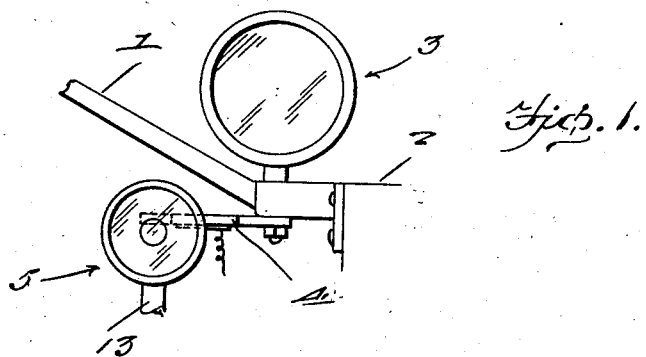
Fig. 1.
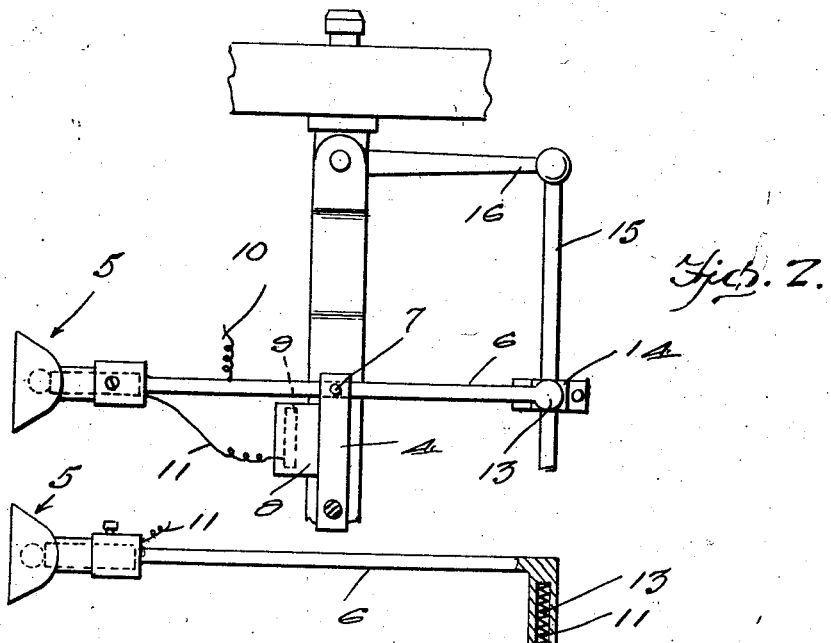
Fig. 2.
Fig. 3.
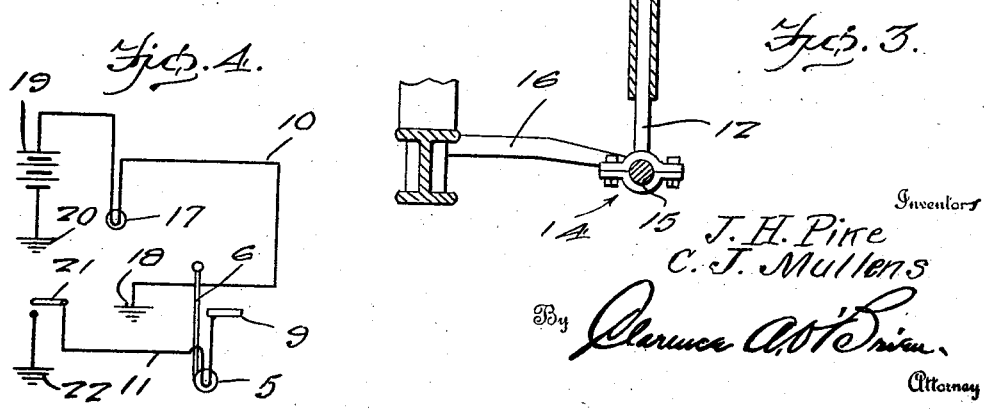
Fig. 4.
Inventors
J. H. Pike
C. J. Mullens
By Clarence A. O'Brien
Attorney Patented May 4, 1926.

UNITED STATES PATENT OFFICE.

JESSE H. PIKE AND CHARLES J. MULLENS, OF PORTAGE, WISCONSIN.

AUTOMOBILE HEADLIGHT.

Application filed July 8, 1925. Serial No. 42,214.

*To all whom it may concern:*

Be it known that we, JESSE H. PIKE and CHARLES J. MULLENS, citizens of the United States, residing at Portage, in the county of Columbia and State of Wisconsin, have invented certain new and useful Improvements in an Automobile Headlight, of which the following is a specification.

This invention relates to improved headlights for automobiles and similar vehicles, and has more specific reference to auxiliary lights mounted on a plane below the main light in a manner to render them dirigible so that they will turn with the back wheel to project light rays upon the path of travel when making turns in the path.

An important advantage is derived from the mounting of the auxiliary dirigible lights on a plane below the main headlights so that the auxiliary lights will cast their rays close to the surface and immediately in front of the wheel, thereby rendering the invention exceedingly desirable when traveling over unknown and treacherous roads.

Another feature of the invention is in the association of novel switch means with the auxiliary light whereby the switch is curved to bring the auxiliary light into play only when a turn is being made, together with the provision of a rear light which is brought into play to indicate when a turn is going to be made.

Other features and advantages of the invention will become apparent from the following description and drawing.

In the accompanying drawing forming a part of this application and in which like numerals are employed to designate like parts throughout the same:

Figure 1 is a front view of a light structure constructed in accordance with the present invention.

Figure 2 is a top plan view of the same showing the construction more completely.

Figure 3 is a side view with portions broken away and shown in section.

Figure 4 is a diagrammatic view of the wiring diagram.

Referring to the drawings in detail, the reference character 1 designates a bracket arm fastened to a relatively stationary part 2 of an automobile, and the reference character 3 designates a stationary headlight. These parts are conventional. Extending out from and connected with the standard of the headlight 3, is an arm or strip 4 which may be referred to as a mounting for the auxiliary light 5. The auxiliary light is carried on the front end of a swingable arm 6 pivoted at 7 to the mounting. The mounting carries a block of insulation material 8 which in turn carries an electric contact 9 on its under side. The arm 6 is adapted to swing beneath its insulation and to engage the contact of completing an electric circuit through the wires 10 and 11, the wire 11 being connected with the contact 9 and an auxiliary headlight and the wire 10 with the arm 6. The inner end of the arm is provided with a depending socket 11′, and an upright 12 telescoped into this socket, there being a coiled spring 13 located in this socket. The upright 12 is mounted on a clamp 14 carried by the transverse rod 15 of the steering mechanism. This rod 15 is of the usual construction and connects at its ends with the crank arms 16 extending rearwardly from the steering knuckle connected with the wheel. The parts 11′ and 12 afford a telescoping connection between the body and chassis to accommodate relative movement.

From the foregoing description it is obvious that the steering wheel is turned in a direction to shift the rod 15 from right to left, the arm 6 will be swung about the pivot 7, thus angling the arm in parallelism with the adjacent wheel. When the arm moves over far enough, it engages the electric contact 9, and closes a circuit through the wires 10 and 11 for lighting the bulb in the auxiliary headlight 5.

By preference, as shown in Figure 4, the wire 10 leads to a light 17 adapted to be mounted on the rear end of the automobile. This light will be provided with the word "Turn," and will be mounted on the same side of the vehicle as the auxiliary light with which it cooperates. Thus, the circuit will be simultaneously closed therethrough and will render the direction signal visible when a turn in that particular direction is to be made. In connection with the wiring diagram, it may be stated that the wire 10 is grounded as at 18 connected with a battery 19, and grounded again at 20. The wire 11 extends to a switch 21 on the instrument board and is grounded at 22.

It is to be understood that although we have shown the invention in use but on a single side of the machine, it is to be utilized on both sides. There will be a rear "turn"

light on each side cooperative with its respective auxiliary lights at the front. It is believed that the construction is clear, and that the advantages derived from the combination of the direction indicating means and auxiliary dirigible lights is clearly apparent. For this reason a more lengthy description is thought unnecessary.

While the preferred embodiment of the invention has been shown and described it is to be understood that minor changes coming within the field of invention claimed may be resorted to if desired.

Having thus described the invention, what we claim as new and desire to secure by Letters Patent is:—

A dirigible spot light for motor vehicles comprising a supporting arm, an electric lamp mounted on the outer end of said supporting arm, a mounting, said arm being pivotally supported intermediate its ends on said mounting, a connection between the outer end of said arm and the connecting rod of the steering gear of the motor vehicle whereby the arm and the lamp mounted on the outer end thereof move in unison with the connecting rod of the usual steering gear, an insulated block carried by the mounting, a contact arranged on the insulated block, an electrical connection between said contact and said lamp, said arm being adapted to swing in a horizontal plane and normally disposed out of engagement with the contact on said insulated block, said arm being adapted to engage the contact when swung to a predetermined position simultaneous with the turning of the wheels of the vehicle.

In testimony whereof we affix our signatures.

JESSE H. PIKE.
CHARLES J. MULLENS.